United States Patent
Rane et al.

(10) Patent No.: US 10,139,855 B2
(45) Date of Patent: Nov. 27, 2018

(54) CASE WITH STRAP COMPRISING COMPUTER CABLE COUPLED THERETO

(71) Applicant: Lenovo (Singapore) Pte. Ltd., New Tech Park (SG)

(72) Inventors: Peter Carlson Rane, Cary, NC (US); Thomas Perelli, Raleigh, NC (US); Ali Kathryn Ent, Raleigh, NC (US); Cuong Huy Truong, Cary, NC (US); Lisa Marie L. Ferrell, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 21 days.

(21) Appl. No.: 15/013,112

(22) Filed: Feb. 2, 2016

(65) Prior Publication Data

US 2017/0220067 A1    Aug. 3, 2017

(51) Int. Cl.

| | |
|---|---|
| *G06F 1/16* | (2006.01) |
| *A45C 3/02* | (2006.01) |
| *A45C 11/00* | (2006.01) |
| *A45C 13/00* | (2006.01) |
| *A45C 13/30* | (2006.01) |
| *A45C 13/10* | (2006.01) |

(52) U.S. Cl.
CPC ............. *G06F 1/1628* (2013.01); *A45C 3/02* (2013.01); *A45C 11/00* (2013.01); *A45C 13/001* (2013.01); *A45C 13/103* (2013.01); *A45C 13/30* (2013.01); *A45C 2011/003* (2013.01)

(58) Field of Classification Search
CPC ......... G06F 1/1628; A45C 3/02; A45C 11/00; A45C 13/001; A45C 13/103; A45C 13/30; A45C 2011/003
See application file for complete search history.

(56) References Cited

U.S. PATENT DOCUMENTS

| | | | | |
|---|---|---|---|---|
| 5,226,540 | A * | 7/1993 | Bradbury | G06F 1/1628 206/320 |
| RE39,052 | E * | 3/2006 | Charles | G06F 1/1632 361/679.32 |
| 7,224,086 | B2 * | 5/2007 | Germagian | A45C 13/02 307/128 |
| 7,366,925 | B2 * | 4/2008 | Keely | G06F 1/1628 361/679.55 |
| 7,828,180 | B2 * | 11/2010 | Slesar | A45F 5/02 119/776 |
| 9,954,380 | B2 * | 4/2018 | Miller | H02J 7/0042 |
| 2005/0030734 | A1 * | 2/2005 | Botzer | A43B 1/0036 362/84 |
| 2010/0313329 | A1 * | 12/2010 | Haynes | A41D 13/0012 2/102 |

FOREIGN PATENT DOCUMENTS

CN        101721042 A  *  6/2010

* cited by examiner

*Primary Examiner* — Jinhee Lee
*Assistant Examiner* — Ingrid Wright
(74) *Attorney, Agent, or Firm* — John L. Rogitz; John M. Rogitz

(57) ABSTRACT

In one aspect, a case includes at least one exterior surface, at least one compartment internal to the exterior surface and in which at least one system component cars be placed, a strap removably engageable with the exterior surface, and a cable coupled to the strap that is useable to transmit at least one of data and power between two devices.

21 Claims, 4 Drawing Sheets

CASE WITH STRAP COMPRISING COMPUTER CABLE COUPLED THERETO

FIELD

The present application relates generally to a case with a strap having a computer cable coupled to the strap.

BACKGROUND

As recognized herein, connecting a device that is disposed within a bag or suitcase to another device can often be difficult and cumbersome, particularly when traveling and when the person does not have a lot of time to spare or space in which to place items removed from the bag.

SUMMARY

Accordingly, in one aspect a case includes at least one exterior surface, at least one compartment internal to the exterior surface and in which at least one system component can be placed, a strap removably engageable with the exterior surface, and a cable coupled to the strap that is useable to transmit at least one of data and power between two devices.

In another aspect, a method includes providing a case comprising at least one exterior surface and at least one compartment in which at least one system component can be placed. The method also includes providing a strap removably engageable with the exterior surface and providing an electrical wire coupled to the strap that transmits at least one of data and power between two devices.

In still another aspect, a step includes an elongated segment comprising at least one opening and a computer cable coupled to the elongated segment to extend out of the opening.

In yet another aspect, an apparatus includes at least one exterior surface, at least one system component, at least one compartment internal to the exterior surface and which accommodates the at least one system component, a strap removably engageable with the exterior surface, and a cable coupled to the strap. The cable is useable to transmit at least one of data and power between the at least one system component and another device.

The details of present principles, both as to their structure and operation, can best be understood in reference to the accompanying drawings, in which like reference numerals refer to like parts, and is which:

DETAILED DESCRIPTION

Figure 1:
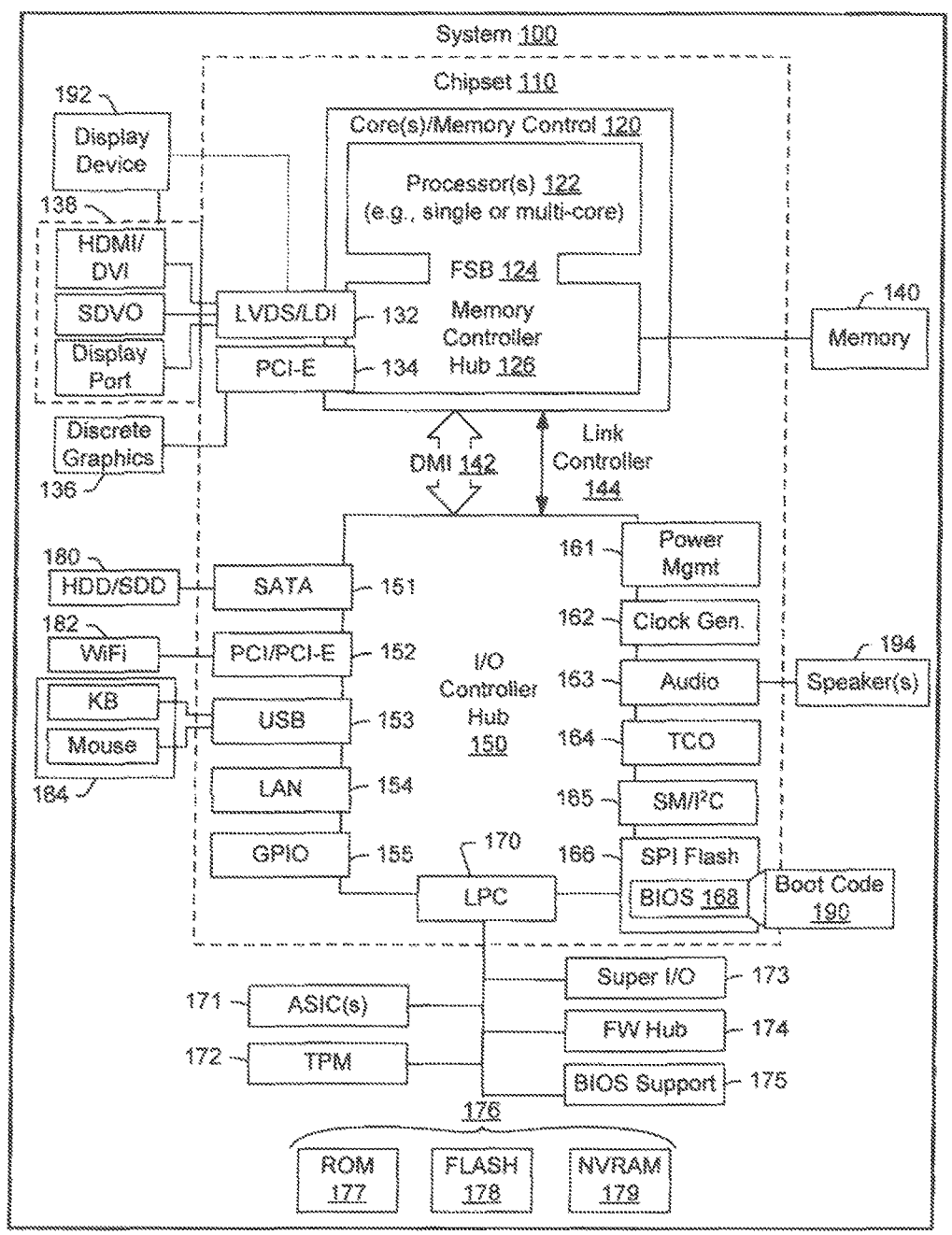
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerised device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interlace (DMI) 142 or a link controller 144. In the example of FIG. 1, the DMI 142 is a chip to chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interlace 132 (e.g., serial digital, video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172 this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
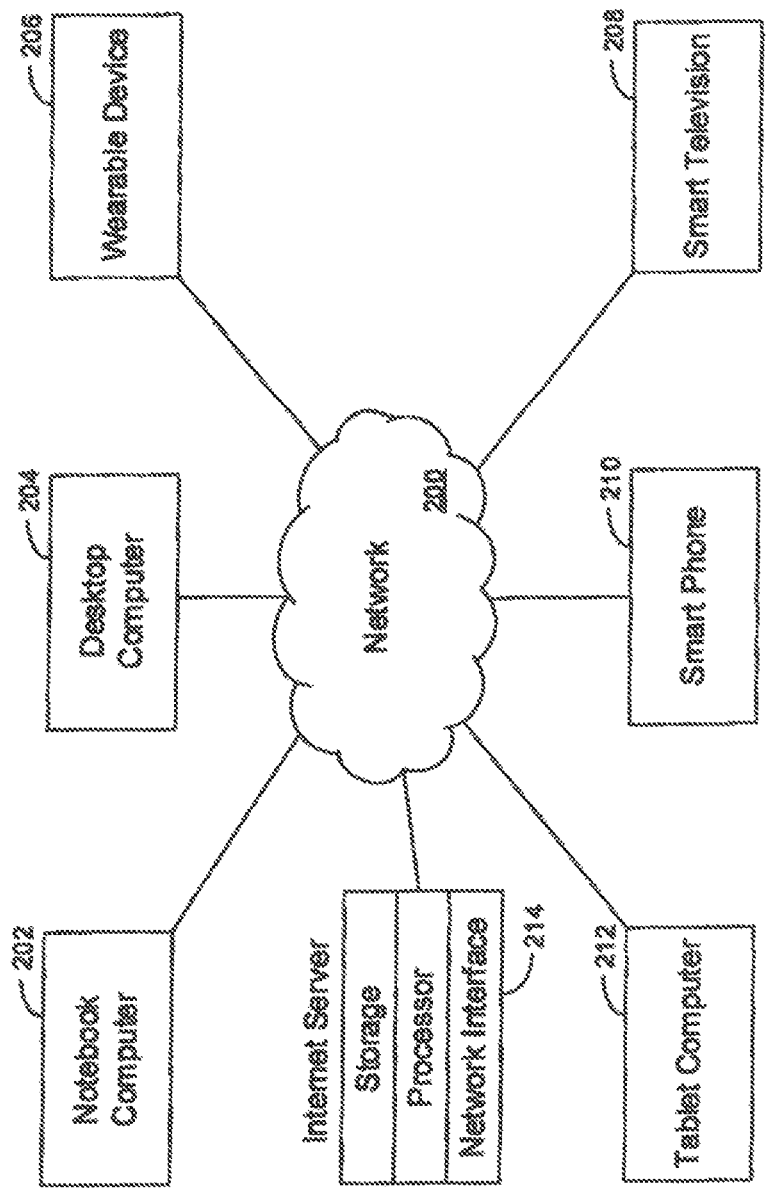
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
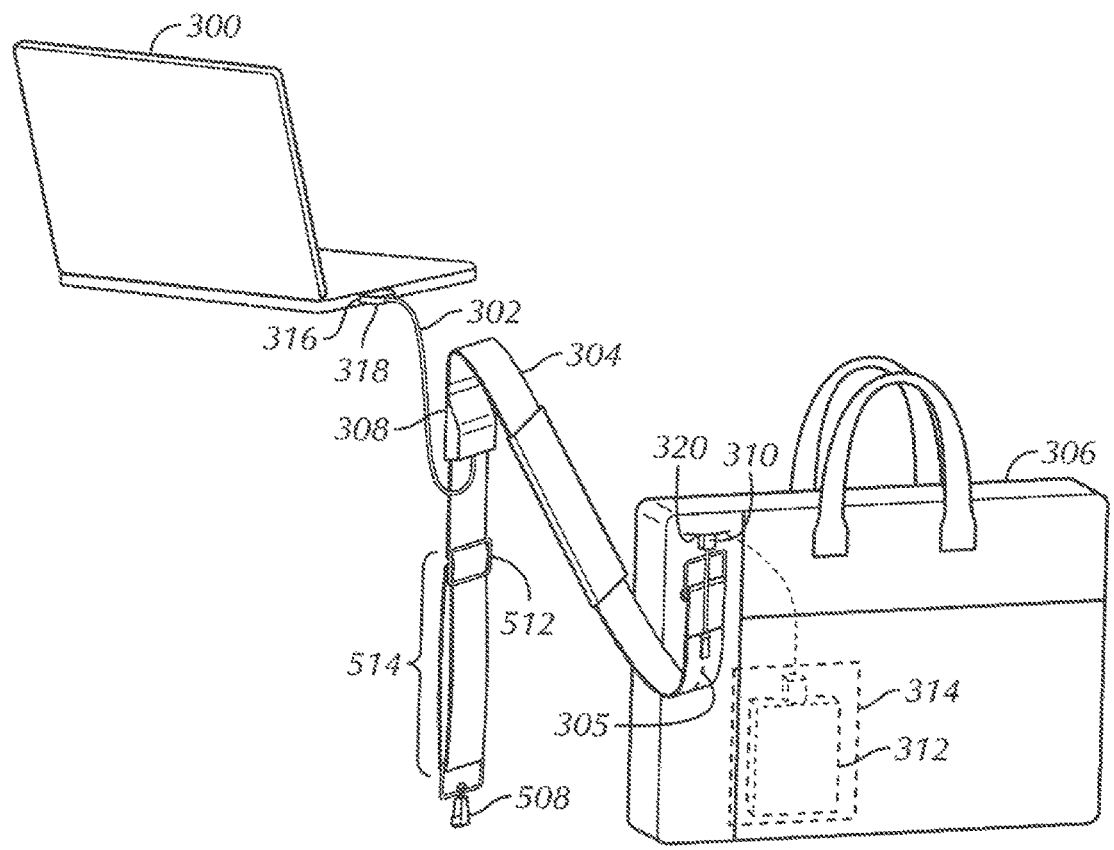
FIG. 3 is perspective view of an example computer cable connected between two devices in accordance with present principles.

Now in reference to FIG. 3, it shows a perspective view of components in accordance with present principles. FIG. 3 shows a laptop computer 300 (that may be similar to the system 100 described above) that is connected to a computer cable, wire, or cord 302 (referred to below as a "wire or cord" for simplicity) via a port 316 on the laptop computer 300 such as a DC-IN connector, universal serial bus (USB) 2.0 connector, etc. The wire or cord 302 is coupled to an elongated strap 304 removably engaged with a travel bag or ease 306 (such as a hard case, a soft and relatively pliable case, or even a housing of a computing device and/or system component such as a Bluetooth speaker), with at least a portion of the wire or cord 302 protruding from the strap 304 at an opening, that may be established by a junction 308, while the wire or cord 302 is coupled to the strap 304. The junction 308 may be established by an intersection of two portions of the strap 304, a buckle through which one or more portions of the strap 304 pass, and/or a pocket in which at least an end segment of the wire or cord 302 (including the connector 318) may be placed.

The wire or cord 302 may have at least a portion thereof sown into the strap 304. In addition to or in lieu of the foregoing, the wire or cord 302 may be coupled to an exterior surface of the strap 304. Still further, also in addition to or in lieu of the foregoing, the strap 304 may include at least one internal compartment thereon in which at least a portion of the wire or cord 302 may be placed, and the strap 304 may also have a zipper mechanism 305 extending longitudinally along the elongated strap 304 that is transitionable between open and closed configurations to provide access to the internal compartment to establish coupling of the wire or cord 302 to the strap by placing the wire or cord 302 inside the internal compartment and zipping the zipper 305 closed so that at least a portion of the wire or cord 302 is secured within the internal compartment.

As may also be appreciated from FIG. 3, the wire or cord 302 is connected at one end to the port 316 on the laptop computer 300 via a connector 318 (such as a DC-IN connector or USB 2.0 connector) at that end of the wire or cord 302, and at another end to a port 310 on an exterior surface of the bag or case 306 via a connector 320 (such as a USB 2.0 connector) on the wire or cord 302. The port 310 may be exposed to elements outside the case 306, or a cover or door may be positioned on the exterior surface of the case 306 to removably (e.g., slidably) cover the port 310 to protect it during travel. It is to be understood that at least one system component 312 may be disposed within an internal compartment 314 of the bag or case 306, and that the system component 312 is electrically couplable to the port 310 as well.

For instance, the system component 312 may be electrically coupled to the port 310 (and hence to the laptop computer 300 when connected via the wire or cord 302) via another wire or cord on or electrically coupled to an opposite end/side of the port 310 than the end/side exposed to the exterior surface of the case 306 to which the wire or cord 302 is connected, where this wire or cord on or electrically coupled (such as via a connector) to the opposite end/side of the port 310 may extend from the port 310 info the internal compartment 314, where it may be connected to a port on the system component 312 via a connector on another end of that wire or cord.

In addition to or in lieu of the foregoing, the side of the port 310 facing and/or disposed internal to the case 306 may be electrically coupled to another, second port inside the case 306. This second port, which may face internal to the case 306 and be accessible from inside the case 306, may fee mounted or oriented on an inside wall of the case 306 (e.g., inside the compartment 314) and may be electrically coupled to a wire or cord (different from the wire/cord 302 and bearing a connector for being electrically coupled to the second port) that may extend from the second port into the internal compartment 314, where it may be connected to the system component 312 using another connector on the other end of this wire or cord. Thus, in some embodiments this wire or cord may be removably engaged with the second port, it also being understood that the other wires/cords disclosed herein may be removably engageable with respective ports to which they are connectable as well (such as via USB 2.0 connectors coupled to ends thereof). Notwithstanding the foregoing, note that in some embodiments the second port may also be directly couplable (instead of via a wire or cord) to the system component in some embodiments.

Still further, in addition to or in lieu of the foregoing, the side of the port 310 facing and/or disposed internal to the case 306 may be electrically coupled to a port replicator that is accessible from inside the case 306, and in some embodiments it may specifically be accessible from inside the compartment 314. This port replicator may he simultaneously connected to the system component 312 and other system components that may be disposed within the case 306.

Describing the system component 312 itself, it may be removably disposable in the compartment 314. It may also be securable in the compartment 314 via a zipper or other fastening element providing access to the compartment 314, and/or maybe secured to and/or sown into the compartment 314. The system component(s) 312 may be a battery, power supply and/or power bank, a computer, a Bluetooth speaker, etc. The system component(s) 312 may also be a hard drive, a Wi-Fi router, a Bluetooth communication enabled speaker, etc.

Before moving on in the detailed description, it is to be understood in reference to FIG. 3 that though a single wire or cord 302 has been described, the wire or cord 302 described above may actually comprise plural wires or cords in accordance with present principles, where those plural wires or cords may be coupled to the strap 304 as described herein, collectable to various ports and system components as described herein, etc. Thus, for instance, a first of plural cables couplable to the strap 304 may be useable to transmit data between the laptop computer 300 and system component 312, while a second of the plural cables may be useable to transmit power between the laptop computer 300 and another system component within the case 306.

Also before moving on, note that the compartment 314 may be a primary internal compartment of the bag or case 306, and/or may be a relatively smaller pocket compared to a primary internal compartment.

Figure 4:
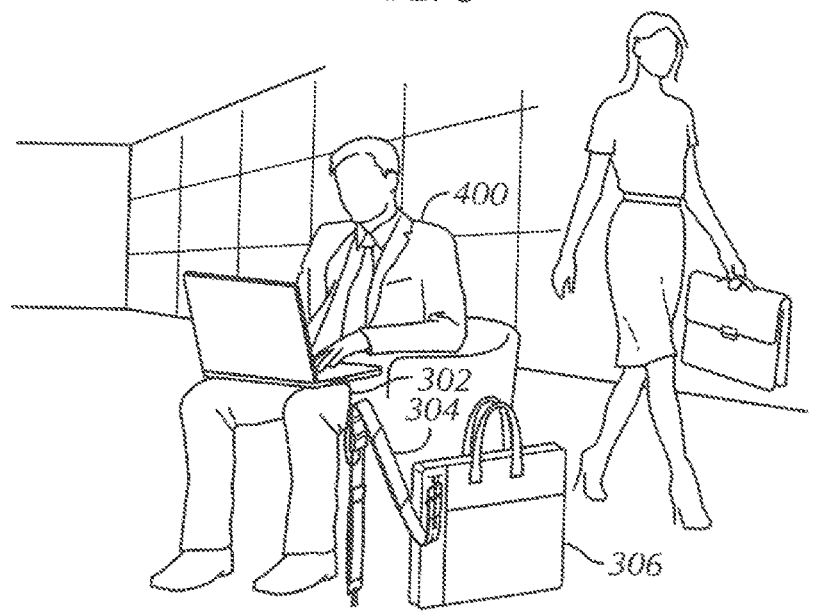
FIG. 4 is an example illustration in accordance with present principles.

Now describing FIG. 4, it shows an illustration in accordance with present principles. A person 400 is sitting in an airport terminal using the laptop computer 300 described above, with the laptop computer 300 connected to a system component in the case 306 via the wire or cord 302 that is coupled to the strap 304 so that the laptop computer 300 may have access to and/or communicate with the system component within the case 306, such as to charge a battery on the laptop computer 300 if the system component is a power bank, or to access storage via the laptop computer 300 if the system component is a hard drive.

Figure 5:
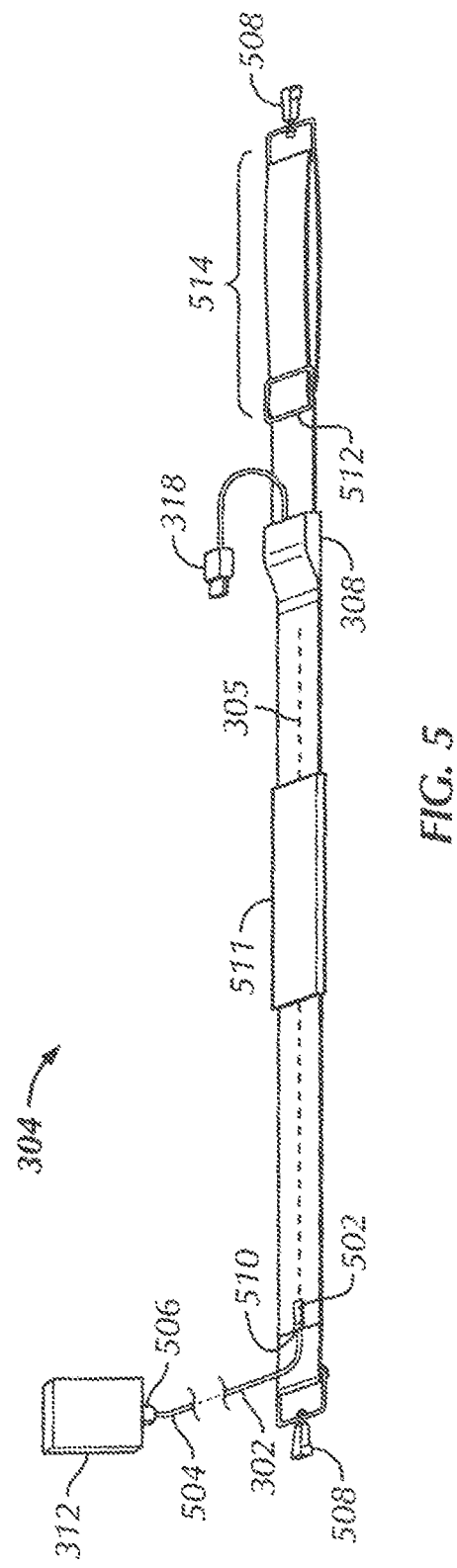
FIG. 5 is a perspective view of an example computer cable in accordance with present principles.

Continuing the detailed description in reference to FIG. 5, a perspective view of the elongated strap 304 described above is shown. A junction 308 established by a pocket is also shown, where the pocket 308 may have opened and closed to provide access to an interior of the pocket in which at least an end segment of the wire or cord 302, and the connector 318, may be placed (such as when they are not in use). The zipper 305 is also shown in a closed configuration owing to a slider 502 of the zipper 305 being slid to or near an end of the zipper 305 to close off access to the interior compartment within the strap 304 in which the wire or cord 302 may be placed. However, also note that even with the zipper 305 in the closed configuration, the cord or wire 302 may protrude from an opening 510 in the interior compartment of the strap 304 to be placed in use to transfer one or more of data and power in accordance with present principles, though this end of the cord 302 may also be positionable within the strap 304 (e.g., when the zipper 305 is in an at least partially open configuration) to securely store it during travel (such as using another pocket disposed on the strap that may be similar to the pocket 308 described above).

The cord or wire 302 is shown as being electrically coupled to the system component 312 for illustration even though the case 306 in which the component 312 is able to be placed is not shown for clarity. Thus, a connector 506 (which may be a USB 2.0 connector) is understood to be coupled to one end of a cord or wire 504 that may be disposed inside the case 306 and extend into an internal compartment of the case 306 in which the system component 312 may be disposed, such as the compartment 314 described above. The cord or wire 504 may be electrically coupled to the wire or cord 302 via one or more ports and/or port replicators coupled to the case 306 as described above, and/or the wire or cord 302 may be directly couplable to the system component 312 via a connector at an end of the wire or cord 302 to be coupled to the component 312.

Still in reference to FIG. 5, the strap 304 may also include fasteners, clasps, hooks, etc. 508 at respective ends thereof for coupling to an exterior surface of the case 306, as well as a shoulder pad 511 that is slidable up and down at least a longitudinal segment of the strap 304. The strap 304 may further include a buckle 512 for adjusting a length of at least a portion 514 of the strap 304 to thus adjust the length of the strap 304 itself.

It is to be understood that although the power cord or wire 302 described above is referenced as connecting a system component to a computer, in some embodiments the power cord or wire 302 may be a power cord having disposed at one end thereof a wall outlet connector so that it may be connected to a wall outlet at that end and the computer at the other end to thus provide power from the wall outlet to the computer.

It may now be appreciated based on the foregoing that a person, while traveling, may relatively easily connect a computer to a system component disposed in one of the person's travel bags so that he or she may charge their device using the system component (such as if the system component is a power bank), access data stored on the system component and/or sync data stored on the system component (such as if the system component is a hard drive), etc.

While the particular CASE WITH STRAP COMPRISING COMPUTER CABLE COUPLED THERETO is herein shown and described in detail, it is to be understood that the subject matter which is encompassed by the present application is limited only by the claims.

What is claimed is:

1. A case, comprising:
   at least one exterior surface;
   at least one compartment internal to the exterior surface and in which at least one system component can be placed; and
   a strap removably engageable with the exterior surface;
   a cable coupled to the strap and that is useable to transmit at least one of data and power between two devices, wherein the cable comprises a connector at a first end of the cable;
   a first port at which the connector is connectable, the first port disposed at the exterior surface; and
   a second port accessible from inside the at least one compartment, the second port electrically coupled to the first port, the second port connectable to a system component.

2. The case of claim 1, wherein at least a portion of the cable is sown into the strap.

3. The case of Claim 1, comprising at least one system component.

4. The case of claim 3, wherein the at least one system component comprises a hard drive.

5. The case of claim 3, wherein the at least one system component comprises a power supply.

6. The case of claim 1, wherein the second port forms part of a port replicator, the port replicator accessible from the compartment, the port replicator connectable to at least one system component.

7. The case of claim 1, wherein the connector is a universal serial bus (USB) connector.

8. The case of claim 1, wherein the compartment is a first compartment, and wherein the strap comprises a zipper providing access to a second compartment in the strap.

9. A method, comprising:
providing a case comprising at least one exterior surface and at least one compartment in which at least one system component can he placed;
providing a strap removably engageable with the exterior surface;
providing an electrical wire coupled to the strap that transmits at least one of data and power between two devices, wherein the electrical wire comprises a first connector at a first end of the electrical wire and a second connector at a second end of the electrical wire;
providing a first port at which the first connector is connectable, the first port being disposed on the exterior surface of the case for exterior connection to the first connector and
providing a second port at which a third connector is connectable, the second port being disposed interior to the case for interior connection to the third connector.

10. The method of claim 9, wherein the second port is disposed on an interior surface of the case for interior connection to the third connector.

11. The method of claim 9, wherein the electrical wire is a first electrical wire, and wherein the method comprises:
providing the third connector and a second electrical wire, wherein the third connector is connected to the second electrical wire at a first end of the second electrical wire, and wherein the second electrical wire connects to the system component a second end of the electrical wire.

12. The method of claim 9, comprising:
providing a cover slideably positioned on the exterior surface to protect the first port from the elements.

13. An apparatus, comprising:
at least one exterior surface;
at least one compartment internal to the exterior surface and which accommodates at least one system component;
a strap removably engageable with the exterior surface;
a cable coupled to the strap and that is useable to transmit at least one of data and power between the at least one system component and another device, wherein the cable comprises a first connector at a first end of the cable and a second connector at a second end of the cable;
a first port at which the first connector is connectable, the first port being disposed on the exterior surface for exterior connection to the first connector; and
an electrical component electrically connected to the first port and disposed interior to the apparatus.

14. The apparatus of claim 13, wherein the at least one system component comprises a hard drive.

15. The apparatus of claim 13, wherein the electrical component comprises a second port at which a third connector is connectable, the second port being disposed interior to the apparatus for interior connection to the third connector.

16. The apparatus of claim 15, wherein the second port is disposed on an interior surface of the apparatus for interior connection to the third connector.

17. The apparatus of Claim 13, wherein the cable is a first cable, and wherein the electrical component comprises a second cable having a first end electrically connected to the first port and a second end that is connectable to the system component.

18. The apparatus of claim 13, wherein the electrical component comprises a port replicator.

19. The apparatus of claim 13, wherein the at least one system component is sown into the at least one compartment internal to the exterior surface.

20. The apparatus of claim 13, comprising the at least one system component.

21. A method, comprising:
providing an apparatus comprising at least one exterior surface;
providing at least one compartment internal to the exterior surface and which accommodates at least one system component;
providing a strap removably engageable with the exterior surface;
providing a cable coupled to the strap and that is useable to transmit at least one of data and power between the at least one system component and another device, wherein the cable comprises a first connector at a first end of the cable and a second connector at a second end of the cable;
providing a first port at which the first connector is connectable, the first port being disposed on the exterior surface for exterior connection to the first connector; and
providing an electrical component electrically connected to the first port and disposed interior to the apparatus.

* * * * *